2,927,099
CURING SYSTEM FOR VINYLPYRIDINE RUBBERS

Henry E. Railsback, Bartlesville, Okla., assignor to Phillips Petroleum Company, a corporation of Delaware No Drawing. Application August 2, 1956
Serial No. 601,632

20 Claims. (Cl. 260—79.5)

This invention relates to vinylpyridine rubbers and improved curing system for preventing premature vulcanization or scorch of vinylpyridine rubbers.

It is important in the compounding of a rubber that vulcanizing ingredients be employed which are effective in curing the rubber in a reasonable time, which give a final product which has good physical properties and which enable the rubber mass to be processed without premature vulcanization or scorch. Additives which produce desirable effects in some ways can have deleterious effects in others. In general, the vulcanization ingredients must be carefully selected for the particular rubber which is to be processed in order that the desired results will be attained. One of the problems which is sometimes encountered in the preparation of rubbers is the problem of premature vulcanization or scorch. When a rubber has been compounded with the necessary additives, it is necessary that the rubber mass remain in an unvulcanized state during the milling, storing and other processing steps which take place prior to vulcanization. It is desirable, in other words, that the rubber does not vulcanize or assume a non-plastic state for a sufficiently long period of time to allow proper milling, molding, or working of the rubber. Premature vulcanization changes the properties of the rubber product and renders it worthless for many uses. Thus, rubber masses which have an undesirably marked tendency to vulcanize prematurely are said to have a high scorch tendency or a low scorch time.

It is known that synthetic rubbers obtained by the copolymerization of vinylpyridines with conjugated dienes and the copolymerization of vinylpyridines with conjugated dienes and other copolymerizable materials when compounded and cured have many desirable characteristics but have the disadvantage of exhibiting a tendency to scorch in a very short time as compared to other types of synthetic rubber compounds. The tendency of vinylpyridine rubbers to scorch is one of the most serious problems connected with the use of these materials. Failure in the prior art to provide a solution for the scorch problem has hindered to some extent the use of this type of synthetic rubber by the industry.

It is an object of this invention to provide improved vinylpyridine rubbers.

Another object of this invention is to provide improved rubber masses which can be cured without scorch or premature vulcanization.

Still another object of this invention is to prevent premature vulcanization or scorching during the curing of vinylpyridine rubbers.

Yet another object of this invention is to provide an improved process for curing vinylpyridine rubbers.

These and other objects of the invention will become more readily apparent from the following detailed description and discussion.

According to this invention, in one aspect thereof, there is provided an improved vulcanizing or curing system comprising sulphur, 4-4'-dithiodimorpholine and a material selected from the group consisting of N-oxydiethylene-2-benzothiazylsulfenamide and N-cyclohexyl-2-benzothiazylsulfenamide.

In another aspect, the invention comprises improved vinylpyridine rubbers prepared by incorporating in said rubbers sulphur, 4-4'-dithiodimorpholine and a compound selected from the group consisting of N-oxydiethylene-2-benzothiazylsulfenamide and N-cyclohexyl-2-benzothiazylsulfenamide.

In still another aspect, the invention comprises a method of curing a vinylpyridine rubber mix by incorporating therein a vulcanizing composition comprising sulphur, 4-4'-dithiodimorpholine and a compound selected from the group consisting of N-oxydiethylene-2-benzothiazylsulfenamide and N-cyclohexyl-2-benzothiazylsulfenamide and subjecting the rubber mix to suitable curing conditions.

The vinylpyridine polymers in which the accelerators of this invention are incorporated are rubbery copolymers of one or more conjugated dienes with one or more vinylpyridine compounds. The vinylpyridine compounds employed can be represented by the formula

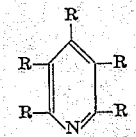

wherein R is selected from the group consisting of hydrogen, alkyl, vinyl, and alpha-methylvinyl (isopropenyl) groups, with at least one and not more than two of the groups being vinyl or alpha-methylvinyl, and the total number of carbon atoms in the alkyl groups being not greater than 12. The alkyl groups are preferably methyl and ethyl groups. Examples of such materials are: 2-vinylpyridine, 3-vinylpyridine, 4-vinylpyridine, 2-vinyl-5-ethylpyridine, 2,5-divinylpyridine, 2-methyl-5-vinylpyridine, 2,3,4-trimethyl-5-vinylpyridine, 3-ethyl-5-vinylpyridine, 2-methyl-5-isopropenylpyridine, 2,4-dimethyl-5-isopropenylpyridine, 3-ethyl-5-isopropenylpyridine, 2-isopropenylpyridine, and 2-vinyl-3,5-diamylpyridine, and 2-vinyl-4,6-dihexylpyridine.

The conjugated dienes employed in the production of vinylpyridine copolymers are preferably those containing from 4 to 6 carbon atoms per molecule, e.g., 1,3-butadiene, isoprene, piperylene, methylpentadiene, 2,3-dimethyl-1,3-butadiene and chloroprene. Conjugated dienes having more than 6, e.g., 8, carbon atoms per molecule can, however, be used when desired. Alkoxy derivatives, such as methoxybutadiene, ethoxybutadiene, etc., cyano derivatives of conjugated dienes, such as 2-cyanobutadiene, 2-methyl-3-cyanobutadiene, and the like can also be used.

In addition to the preceding compositions, the vinylpyridine rubber can contain a third type of polymerizable monomer, for example, styrene or an alkoxy derivative thereof, such as methoxystyrene, ethoxystyrene; alkyl substituted styrenes, such as methylstyrene, ethylstyrene; acrylonitrile, methacrylonitrile; acrylates, for example, methyl acrylate, ethyl acrylate, propyl acrylate, butyl acrylate; methacrylates such as methyl methacrylate and the like.

In the preparation of vinylpyridine rubbers, the proportion of the various monomers can vary over a wide range. For example, the conjugated diene can vary from 50 to 98 parts by weight, the vinylpyridine compound from 50 to 2 parts by weight and the third monomer, such as acrylonitrile, from 0 to 48 parts by weight per 100 parts by weight of total monomers. The ranges given are merely illustrative in nature and are not intended to include all of the polymers which can be prepared by the use of various combinations of the monomers given.

The vulcanizing system of this invention comprises sulphur, 4-4'-dithiomorpholine and a compound selected from the group consisting of N-oxydiethylene-2-benzothiazylsulfenamide and N-cyclohexyl-2-benzothiazylsulfenamide. It has been found that when these materials are present, vinylpyridine rubbers can be compounded without danger of scorching during milling and the resulting vulvanizates have excellent properties. The amount of sulphur employed in the vulcanization or curing system is between about 0.4 and about 2.25 parts by weight; the amount of 4-4'-dithcdimorpholine is between about 0.5 and about 4 parts by weight and preferably between about 1.0 and about 2.5 and the amount of compound selected from the group consisting of N-oxydiethylene-2-benzothiazylsulfenamide and N-cyclohexyl-2-benzothiazylsulfenamide is between about 0.25 and about 2 parts by weight and preferably between about 0.5 and about 1.25, all per 100 parts of rubber. These materials are ordinarily incorporated into the rubber mass along with other additives such as fillers, softeners, etc. The components which make up the vulcanizing system can be introduced separately into the rubber mass or they can be admixed prior to being incorporated into the rubber.

The vinylpyridine copolymers are prepared according to methods well known in the art, for example, by mass or emulsion polymerization techniques utilizing suitable catalyst compositions. The polymers are then mixed with the desired additives and subjected to the usual milling or working treatments. The mass, thus obtained, is then subjected to molding and vulcanization as known in the art.

In general the polymerization process is carried out by forming an emulsion of the monomers in water with the aid of an emulsifying agent such as a fatty acid soap, a rosin acid soap, an alkyl aryl sulfonate, etc. Other ingredients include activators, initiators and modifiers. Preferably the system is maintained alkaline, that is, at a pH of about 9–12 and the polymerization takes place at a temperature between about −40° F. and about 150° F. A large variety of polymerization recipes can be used, typical of which are the potassium persulfate recipe, the sodium formaldehyde sulfoxylate recipe and the ferrous pyrophosphate recipe.

The mass polymerization process is carried out in a nonaqueous system in the presence of a diluent material. Suitable diluents include acyclic hydrocarbons, such as n-butane, n-pentane, etc., alicyclic hydrocarbons, such as cyclohexane and aromatic hydrocarbons such as benzene. The catalyst employed is usually an alkali metal, such as sodium.

The following examples are presented in illustration of the various aspects of the invention:

EXAMPLE I

Butadiene was copolymerized with 2-methyl-5-vinylpyridine in aqueous emulsion at 41° F. Five runs were made in accordance with the following recipes:

|  | Parts by Weight | |
|---|---|---|
|  | A | B |
| Water | 200 | 200 |
| Methanol [1] |  | 0.10 |
| Butadiene | 75 | 75 |
| 2-methyl-5-vinylpyridine | 25 | 25 |
| Potassium fatty acid soap | 6 | 6 |
| KOH | 0.10 | 0.10 |
| KCl | 0.40 | 0.40 |
| Tamol N [2] | 0.30 | 0.30 |
| $FeSO_4 \cdot 7H_2O$ | 0.02 | 0.02 |
| Sequestrene AA [3] | 0.04 | 0.04 |
| Sodium formaldehyde sulfoxylate | 0.10 | 0.10 |
| Cumene hydroperoxide | 0.10 |  |
| p-Menthane hydroperoxide |  | 0.10 |
| Tert-dodecyl mercaptan, original charge | Variable | Variable |
| Tert-dodecyl mercaptan, booster | Variable | Variable |
| Shortstop: Thiostop N.[4] | Variable | Variable |
| Antioxidant (parts by 100 parts rubber): Phenyl-beta-naphthylamine. | | |

[1] Charged with mercaptan booster.
[2] Sodium salt of a naphthalene sulfonic acid condensed with formaldehyde.
[3] Ethylene diamine tetraacetic acid.
[4] Sodium dimethyldithiocarbamate.

*Mercaptan increment*

| Run No. | Recipe | Mercaptan, Part Original Charge | Part | Conversion, Percent | Reaction Time, Hours | Conversion Mooney | |
|---|---|---|---|---|---|---|---|
|  |  |  |  |  |  | Percent | ML-4 |
| 1 [1] | A | 0.21 | 0.21 | 60 | 34.0 | 88 | 64 |
| 2 [2] | A | 0.22 | 0.22 | 60 | 32.5 | 92 | 60 |
| 3 | B | 0.23 | 0.23 | 62 | 26.3 | 95 | 64 |
| 4 | B | 0.26 | 0.26 | 60 | 20.9 | 90 | 36 |
| 5 | B | 0.23 | 0.23 | 60 | 15.5 | 90 | [3] 54 |

[1] One-half charge of activator and cumene hydroperoxide at 28.8 hours (84.4 percent conversion).
[2] Two initiator boosters: Each one-half charge of activator and cumene hydroperoxide added at 17.4 and 25.4 hours, respectively (60.0 and 84.3 percent conversions).
[3] Vented Mooney.

The latices were blended and the blend was coagulated. The brine-acid procedure was utilized for coagulation with the crumb being given two caustic washes and two water washes (all at 150° F.). The final product had a Mooney value (ML–4) of 55.

The butadiene/2-methyl-5-vinylpyridine rubber was compounded in accordance with the following tread recipe:

| | Parts by weight |
|---|---|
| Butadiene/2-methyl-5-vinylpyridine rubber | 100 |
| Carbon black (Philblack O) [1] | 50 |
| Zinc oxide | 3 |
| Stearic acid | 1 |
| Circo-para [2] | 10 |
| Flexamine [3] | 1 |
| Sulfur | Variable |
| Sulfasan R [4] | Variable |
| NOBS Special [5] | Variable |

[1] High abrasion furnace black.
[2] Mixture of equal parts by weight of Circosol 2XH with Paraflux (Circosol 2XH: A petroleum hydrocarbon softener, containing hydrocarbons of high molecular weight, in the form of a heavy, viscous, transparent, pale green, odorless liquid of low volatility; sp. gr. 0.940; Saybolt Universal viscosity at 100° F., about 2,000 seconds. Para Flux Z016: Saturated polymerized hydrocarbon).
[3] Physical mixture containing 65 percent of a complex diarylamineketone reaction product and 35 percent of N,N'-diphenyl-p-phenylenediamine.
[4] 4,4'-Dithiodimorpholine.
[5] N-oxydiethylene-2-benzothiazylsulfenamide.

The samples were milled, cured 30 minutes at 307° F., and physical properties determined. Results are given in Tables 1 and 2.

TABLE I

| Sample No. | Sulfur, phr.[1] | Sulfasan R,[2] phr.[1] | NOBS Special,[3] phr.[1] | Compression Set, percent | 80° F. 300% Modulus, p.s.i. | 80° F. Tensile, p.s.i. | 80° F. Elongation, percent | ΔT, F. | Resilience, percent | Flex Life, M[4] | Shore Hardness | 212° F. Compounded MS-1½ | Scorch at 280° F. Minimum Mooney | Scorch at 280° F. Five Point Rise, min.[5] | Scorch at 300° F. Minimum Mooney | Scorch at 300° F. Five Point Rise, min.[5] |
|---|---|---|---|---|---|---|---|---|---|---|---|---|---|---|---|---|
| 1 | 0.4 | 1.5 | 1.25 | 27.0 | 1,220 | 2,880 | 520 | 76.0 | 57.8 | 12.0 | 53 | 34.5 | 36.5 | 23 | 35 | 12.5 |
| 2 | 0.8 | 1.0 | 1.25 | 13.0 | 1,670 | 3,330 | 510 | 61.5 | 62.3 | ------ | 53.5 | ------ | 35 | 14 | 33 | 8 |
| 3 | 0.8 | 1.5 | 1.25 | 15.6 | 1,930 | 3,370 | 460 | 55.8 | 64.3 | ------ | 55.5 | ------ | 34.5 | 17 | 32.5 | 9.5 |
| 4 | 0.8 | 2.0 | 1.25 | 19.4 | 2,175 | 3,125 | 400 | 52.4 | 66.7 | ------ | 56 | ------ | 34 | 21 | 30.5 | 12 |
| 5 | 0.8 | 2.5 | 1.25 | 23.6 | 2,340 | 3,000 | 370 | 49.0 | 67.2 | ------ | 57 | ------ | 33 | 22 | 29.5 | 12.5 |
| 6 | 1.0 | 1.0 | 0.5 | 21.8 | 1,290 | 2,740 | 535 | 84.5 | 55.7 | 11.2 | 56.5 | 33 | 33.5 | 18 | 35 | 10.5 |
| 7 | 1.0 | 1.0 | 0.75 | 18.8 | 1,375 | 3,180 | 550 | 75.0 | 57.5 | 10.2 | 58 | 33.5 | 34.5 | 18 | 35 | 11 |
| 8 | 1.0 | 1.0 | 1.0 | 15.6 | 1,610 | 3,300 | 500 | 67.6 | 60.2 | 8.5 | 59.5 | 31.5 | 34 | 18 | 34 | 10.5 |
| 9 | 1.0 | 1.0 | 1.25 | 14.0 | 1,775 | 3,280 | 475 | 61.9 | 62.2 | 7.8 | 59 | 32.5 | 33 | 18 | 33.5 | 11 |
| 10 | 1.0 | 1.5 | 0.5 | 23.1 | 1,425 | 3,120 | 510 | 70.6 | 59.1 | 9.8 | 59 | 32.5 | 35 | 21 | 35 | 11.5 |
| 11 | 1.0 | 1.5 | 0.75 | 20.4 | 1,690 | 3,260 | 495 | 63.8 | 61.1 | 10.5 | 61.5 | 31.5 | 34 | 21.5 | 34.5 | 13 |
| 12 | 1.0 | 1.5 | 1.0 | 17.2 | 1,840 | 3,400 | 470 | 58.1 | 63.6 | 9.6 | 63 | 32.5 | 33.5 | 21 | 34 | 12.5 |
| 13 | 1.0 | 2.0 | 1.25 | 17.3 | 2,400 | 3,030 | 355 | 49.0 | 68.2 | ------ | 57.5 | ------ | 34.5 | 22.5 | 30 | 12 |
| 14 | 1.0 | 2.5 | 1.25 | 19.6 | 2,660 | 3,270 | 360 | 44.6 | 70.4 | ------ | 58 | ------ | 33 | 24 | 30 | 13 |
| 15 | 1.25 | 1.0 | 1.25 | 14.0 | 2,260 | 3,200 | 425 | 56.5 | 65.2 | ------ | 56.5 | ------ | 35 | 16.5 | 31.5 | 10 |
| 16 | 1.25 | 1.5 | 1.25 | 14.6 | 2,275 | 3,080 | 375 | 47.9 | 68.5 | ------ | 58 | ------ | 34.5 | 19 | 30 | 10.5 |
| 17 | 1.25 | 2.0 | 1.25 | 15.8 | 2,670 | 3,090 | 345 | 45.3 | 70.7 | ------ | 59 | ------ | 35 | 19.5 | 31 | 11 |
| 18 | 1.25 | 2.5 | 1.25 | 18.0 | 2,870 | 2,990 | 310 | 42.9 | 71.9 | ------ | 60 | ------ | 34.5 | 21 | 30.5 | 12 |
| 19 | 1.5 | 1.0 | 1.25 | 14.2 | 2,190 | 3,240 | 405 | 53.4 | 66.4 | ------ | 57.5 | ------ | 35.5 | 16 | 31.5 | 9.5 |
| 20 | 1.5 | 1.5 | 1.25 | 14.4 | 2,580 | 3,210 | 360 | 48.7 | 67.7 | ------ | 59 | ------ | 34.5 | 18 | 31.5 | 10 |
| 21 | 1.5 | 2.0 | 1.25 | 15.0 | 2,810 | 2,990 | 315 | 42.9 | 71.3 | ------ | 60 | ------ | 32.5 | 19 | 31 | 11 |
| 22 | 1.5 | 2.5 | 1.25 | 16.8 | 3,040 | 3,040 | 300 | 41.9 | 72.6 | ------ | 61 | ------ | 33.5 | 21.5 | 32 | 11 |
| 23 | 1.75 | 2.5 | 1.25 | 16.1 | ------ | 2,800 | 270 | 39.9 | 73.9 | ------ | 62.5 | ------ | 32.5 | 20 | 32 | 11 |
| 24 | 2.25 | 2.5 | 1.25 | 17.6 | ------ | 2,875 | 260 | 39.9 | 74.1 | ------ | 64 | ------ | 34 | 19 | 32.5 | 10.5 |
| 25 | 2.25 | ------ | 1.0 | 17.9 | 1,740 | 3,050 | 450 | 66.2 | 61.2 | 8.8 | 61.5 | 34 | 37 | 10 | 37 | 6.5 |
| 26 | ------ | 3.25 | 1.25 | 38.1 | | | | | | | | | | Did not Cure. | | |
| 27 | ------ | 3.5 | 1.25 | 37.8 | | | | | | | | | | | | |
| 28 | 0.1 | 3.0 | 1.25 | 44.7 | | | | | | | | | | | | |
| 29 | 0.2 | 3.0 | 1.25 | 51.9 | | | | | | | | | | | | |

[1] Parts by weight per 100 parts rubber.
[2] 4,4'-dithiodimorpholine.
[3] N-oxydiethylene-2-benzothiazylsulfenamide.
[4] Thousands of flexures to failure.
[5] Time for Mooney to rise 5 points, after reaching minimum.

TABLE 2

[Oven aged 24 hours at 212° F.]

| Sample No. | Sulfur, phr. | Sulfasan R, phr. | NOBS Special, phr. | 80° F. 300% Modulus p.s.i. | 80° F. Tensile, p.s.i. | 80° F. Elongation, Percent | ΔT, ° F. | Resilience, Percent | Flex Life, M | Shore Hardness |
|---|---|---|---|---|---|---|---|---|---|---|
| 1 | 0.4 | 1.5 | 1.25 | 1,560 | 3,110 | 490 | 62.8 | 63.9 | 11.6 | 57.5 |
| 2 | 0.8 | 1.0 | 1.25 | 2,240 | 3,260 | 395 | 58.8 | 64.9 | ------ | ------ |
| 3 | 0.8 | 1.5 | 1.25 | 2,620 | 3,200 | 350 | 53.0 | 67.7 | ------ | ------ |
| 4 | 0.8 | 2.0 | 1.25 | 2,840 | 3,275 | 340 | 50.3 | 70.2 | ------ | ------ |
| 5 | 0.8 | 2.5 | 1.25 | 2,970 | 3,110 | 315 | 45.3 | 71.9 | ------ | ------ |
| 6 | 1.0 | 1.0 | 0.5 | 1,810 | 3,225 | 470 | 72.3 | 60.5 | 8.9 | 61 |
| 7 | 1.0 | 1.0 | 0.75 | 1,960 | 3,190 | 440 | 67.6 | 62.4 | 8.3 | 62.5 |
| 8 | 1.0 | 1.0 | 1.0 | 2,260 | 2,840 | 355 | 63.5 | 63.9 | 6.1 | 64 |
| 9 | 1.0 | 1.0 | 1.25 | 2,300 | 2,830 | 350 | 58.1 | 65.8 | 5.6 | 65 |
| 10 | 1.0 | 1.5 | 0.5 | 2,110 | 3,230 | 410 | 63.8 | 64.0 | 6.3 | 64 |
| 11 | 1.0 | 1.5 | 0.75 | 2,390 | 3,110 | 370 | 58.1 | 65.5 | 4.5 | 64.5 |
| 12 | 1.0 | 1.5 | 1.0 | 2,550 | 3,190 | 370 | 55.4 | 68.4 | 5.3 | 66 |
| 13 | 1.0 | 2.0 | 1.25 | ------ | 2,950 | 295 | 44.9 | 69.4 | ------ | ------ |
| 14 | 1.0 | 2.5 | 1.25 | ------ | 3,175 | 280 | 42.6 | 74.7 | ------ | ------ |
| 15 | 1.25 | 1.0 | 1.25 | 2,440 | 2,925 | 310 | 53.4 | 66.8 | ------ | ------ |
| 16 | 1.25 | 1.5 | 1.25 | ------ | 2,775 | 275 | 48.3 | 70.7 | ------ | ------ |
| 17 | 1.25 | 2.0 | 1.25 | ------ | 2,770 | 245 | 43.6 | 72.4 | ------ | ------ |
| 18 | 1.25 | 2.5 | 1.25 | ------ | 2,950 | 240 | 40.9 | 73.8 | ------ | ------ |
| 19 | 1.5 | 1.0 | 1.25 | 2,900 | 2,970 | 310 | 50.3 | 69.3 | ------ | ------ |
| 20 | 1.5 | 1.5 | 1.25 | ------ | 2,970 | 265 | 44.6 | 70.8 | ------ | ------ |
| 21 | 1.5 | 2.0 | 1.25 | ------ | 3,160 | 265 | 43.3 | 74.2 | ------ | ------ |
| 22 | 1.5 | 2.5 | 1.25 | ------ | 2,590 | 210 | 41.9 | 75.4 | ------ | ------ |
| 23 | 1.75 | 2.5 | 1.25 | ------ | 2,475 | 195 | 40.2 | 75.2 | ------ | ------ |
| 24 | 1.25 | 2.5 | 1.0 | ------ | 2,525 | 175 | 39.9 | 75.8 | ------ | ------ |
| 25 | 2.25 | ------ | 1.0 | 2,690 | 2,925 | 325 | 58.1 | 67.6 | 2.5 | 65 |

EXAMPLE II

A butadiene/styrene/2-methyl-5-vinylpyridine terpolymer was prepared by emulsion polymerization at 41° F. in accordance with the following recipe:

| | Parts by weight |
|---|---|
| Water | 180 |
| Butadiene | 85 |
| Styrene | 10 |
| 2-methyl-5-vinylpyridine | 5 |
| Potassium fatty acid soap | 5 |
| KOH | 0.05 |
| KCl | 0.40 |
| Daxad 11[1] | 0.20 |
| $FeSO_4 \cdot 7H_2O$ | 0.015 |
| Sodium formaldehyde sulfoxylate | 0.05 |
| Sequestrene AA[2] | 0.03 |
| Cumene hydroperoxide | 0.075 |
| tert-Dodecyl mercaptan | Variable |
| Shortstop: Goodrite 3955[3] | 0.15 |
| Antioxidant (phr.): Phenyl - beta - naphthylamine | 2.0 |

[1] Sodium salt of condensed alkyl aryl sulfonic acid.
[2] As in Example I.
[3] 50/50 mixture of sodium dimethyldithiocarbamate and sulfur in the form of sodium polysulfide.

Two runs were made. Details are shown in the following table:

| Run No. | Soap Solution, pH | Time, Hours | Conversion, Percent | Mercaptan, Parts | Mooney (ML-4), Stripped |
|---|---|---|---|---|---|
| 1 | 10.8 | 31.4 | 90.0 | [2] 0.50 | 41 |
| 2 [1] | 11.0 | 30.5 | 92.4 | [3] 0.44 | 68 |

[1] One-half charge of activator and cumene hydroperoxide added at 5.7 hours (1.5 percent conversion).
[2] One-half in original charge and one-half at 59.5 percent conversion.
[3] One-half in original charge and one-half at 60.9 percent conversion.

The latices were blended and the blend was coagulated using the brine-acid technique. The crumb was given two 15-minute caustic washes at a temperature of 150° F. followed by two 15 minute hot water washes. The final product had a Mooney value (ML-4) of 56.

A butadiene/2-methyl-5-vinylpyridine/acrylonitrile terpolymer was prepared by emulsion polymerization at 41° F. in accordance with the following recipe:

| | Parts by weight |
|---|---|
| Water | 200 |
| Butadiene | 70 |
| 2-methyl-5-vinylpyridine | 10 |
| Acrylonitrile | 20 |
| Potassium fatty acid soap | 6 |
| KOH | 0.1 |
| KCl | 0.3 |
| Tamol N [1] | 0.3 |
| $FeSO_4 \cdot 7H_2O$ | 0.02 |
| Sequestrene AA [1] | 0.04 |
| Sodium formaldehyde sulfoxylate | 0.1 |
| p-Menthane hydroperoxide | 0.1 |
| tert-Dodecyl mercaptan | Variable |
| Shortstop: Goodrite 3955 | 0.15 |
| Antioxidant (phr.): Phenyl-beta-naphthylamine | 2.0 |

[1] As in Example I.

Two runs were made. Details are shown in the following table:

| Run No. | Mercaptan, Part Original Charge | Mercaptan Increment Part | Mercaptan Increment Time, Hours | Mercaptan Increment Conversion, Percent | Reaction Time, Hours | Conversion, Percent | Mooney (ML-4) |
|---|---|---|---|---|---|---|---|
| 3 [2] | 0.26 | 0.26 | 10.2 | 63.4 | 16.4 | 94.2 | 41 |
| 4 [2] | 0.22 | 0.22 | 14.6 | 60.0 | 28.4 | 97.7 | 74 |

[1] One-third of the initiator was charged initially, one-third after 3 hours' and one-third at 63.4 percent conversion.
[2] One-half of the initiator was charged initially and one-half at 60 percent conversion.

The latices were blended and the blend was coagulated using brine acid at a pH of 2.0–3.0. The crumb was given two caustic washes at 150° F. and two hot water washes. The final product had a Mooney value of 55.

The butadiene/styrene/2-methyl-5-vinylpyridine and the butadiene/2-methyl-5-vinylpyridine/acrylonitrile terpolymers were compounded in accordance with the following tread formation:

| | Parts by weight |
|---|---|
| Rubber | 100 |
| Carbon black (Philblack O) [1] | 50 |
| Zinc oxide | 3 |
| Stearic acid | 1 |
| Circo-para [1] | 10 |
| Flexamine [1] | 1 |
| Sulfur | Variable |
| Sulfasan R [1] | Variable |
| NOBS Special [1] | Variable |

[1] As in Example I.

The stocks were milled, cured 30 minutes at 307° F., and physical properties determined. Results are given in Table 3.

TABLE 3

| | BD/Styrene/MVP Sample No. | | BD/MVP/Acrylonitrile Sample No. | |
|---|---|---|---|---|
| | 1 | 2 | 3 | 4 |
| Unaged: | | | | |
| Sulfur, phr | 1 | 1.75 | 1 | 1.75 |
| Sulfasan R, phr | 1.5 | | 1.5 | |
| NOBS special, phr | 0.75 | 1.0 | 0.75 | 1.0 |
| Compression set, percent | 15.8 | 15.4 | 16.2 | 14.2 |
| 300 Percent modulus, p.s.i., 80° C | 1,630 | 1,375 | 2,000 | 1,990 |
| Tensile, p.s.i., 80° F | 2,880 | 2,770 | 3,170 | 3,310 |
| Elongation, percent, 80° F | 430 | 475 | 430 | 470 |
| ΔT, °F | 60.5 | 72.6 | 66.6 | 74.7 |
| Resilience, percent | 64.8 | 61.5 | 58.9 | 59.1 |
| Flex life, thousands of flexures to failure | 2.7 | 3.0 | 6.4 | 6.9 |
| Shore hardness | 57.5 | 57.5 | 64.5 | 65.5 |
| 212° F. compounded MS-1½ | 35.5 | 36.5 | 37.5 | 39 |
| Scorch at 280° F.: | | | | |
| Minimum Mooney | 37.5 | 39.5 | 37.5 | 40 |
| 5 point rise, minutes | 27 | 15.5 | 14.5 | 7.5 |
| Aged 24 hours at 212° F.: | | | | |
| 300 percent modulus, p.s.i., 80° F | 2,070 | 2,010 | 2,675 | 2,750 |
| Tensile, p.s.i., 80° F | 2,910 | 2,820 | 3,340 | 3,160 |
| Elongation, percent, 80° F | 380 | 385 | 375 | 340 |
| ΔT, °F | 59.1 | 67.6 | 63.5 | 70.3 |
| Resilience, percent | 66.5 | 64.3 | 61.8 | 61.2 |
| Flex life, thousands of flexures to failure | 2.8 | 2.2 | 18.8 | 8.8 |
| Shore hardness | 62.5 | 62 | 69 | 69.5 |

[1] Butadiene/styrene/2-methyl-5-vinylpyridine.
[2] Butadiene/2-methyl-5-vinylpyridine/acrylonitrile.

EXAMPLE III

An 85/15 butadiene/2-methyl-5-vinylpyridine rubber was compounded in accordance with the following tread recipe:

| | Parts by weight |
|---|---|
| Rubber | 100 |
| Carbon Black (Philblack O) [1] | 50 |
| Zinc oxide | 3 |
| Stearic acid | 1 |
| Circo-para [1] | 10 |
| Flexamine [1] | 1 |
| Sulfur | 1.0 |
| Sulfasan R [1] | 1.5 |
| NOBS Special [1] | 0.75 |

[1] As in Example I.

TABLE 4

The stock was milled, cured 30 minutes at 307° F., and physical properties determined. The results are given in Table 4.

Unaged:
| | |
|---|---|
| Mooney value, ML-4 | 50.1 |
| Compression set, percent | 15.3 |
| 300 percent modulus, p.s.i., 80° F. | 1,780 |
| Tensile, p.s.i., 80° F. | 3,030 |
| Elongation, percent, 80° F. | 430 |
| ΔT, ° F. | 60.8 |
| Resilience, percent | 62.2 |
| Flex life, thousands of flexures to failure | 5.0 |
| Shore hardness | 62 |
| 212 F. compounded MS-1½ | 33.5 |
| Scorch at 280° F.— | |
| Minimum Mooney | 37 |
| 5 point rise, minutes | 19.5 |

Oven aged 24 hours at 212° F.:
| | |
|---|---|
| 300 percent modulus, p.s.i., 80° F. | 2,130 |
| Tensile, p.s.i., 80° F. | 2,970 |
| Elongation, percent, 80° F. | 360 |
| ΔT, ° F. | 57.5 |
| Resilience, percent | 66.4 |
| Flex life, thousands of flexures to failure | 3.5 |
| Shore hardness | 62.5 |

EXAMPLE IV

Two butadiene/2-methyl-5-vinylpyridine rubbers, 75/25 and 85/15 copolymers, were compounded in accordance with the following carcass recipe:

| | Parts by weight |
|---|---|
| Rubber | 100 |
| Carbon black (Philblack O) [1] | 25 |
| Zinc oxide | 3 |
| Stearic acid | 1 |
| Agerite resin D [2] | 1 |
| Paraflux [1] | 5 |
| Staybelite resin [3] | 2.5 |
| Sulfur | Variable |
| Sulfasan R [1] | 1.5 |
| NOBS Special [1] | Variable |

[1] As in Example I.
[2] Polymerized trimethyldihydroquinoline.
[3] Hydrogenated resin.

The stocks were milled, cured 30 minutes at 307° F., and physical properties determined. Results are given in Table 5.

TABLE 5
(75/25 Butadiene/2-Methyl-5-Vinylpyridine Rubber)

| Sample No. | Sulfur, phr. | Sulfasan R, phr. | NOBS Special, phr. | Compression Set, Percent | 300% Modulus, p.s.i. | Tensile, p.s.i. | Elongation, Percent | ΔT, °F. | Resilience, Percent | Flex Life, M | Shore Hardness | 212° F. Compounded MS-1½ | Scorch at 280° F. Minimum Mooney | Scorch at 280° F. 5 Point Rise, min. |
|---|---|---|---|---|---|---|---|---|---|---|---|---|---|---|
| 1 | 1.0 | 1.5 | 1.0 | 17.6 | 800 | 2,280 | 540 | 41.5 | 68.0 | 8.0 | 53 | 21 | 20.5 | 22.5 |
| 2 | 1.25 | 1.5 | 1.0 | 16.6 | 780 | 2,120 | 500 | 39.9 | 69.5 | 5.2 | 53.5 | 21.5 | 20.5 | 20 |
| 3 | 1.5 | 1.5 | 1.0 | 16.4 | 980 | 2,370 | 500 | 37.8 | 71.5 | 2.4 | 54 | 21 | 20.5 | 19 |
| 4 | 1.5 | 1.5 | 1.25 | 14.8 | 1,100 | 1,940 | 410 | 36.1 | 72.5 | 2.0 | 55.5 | 21 | 20.5 | 19 |

(85/15 Butadiene/2-Methyl-5-Vinylpyridine Rubber)

| Sample No. | Sulfur, phr. | Sulfasan R, phr. | NOBS Special, phr. | Compression Set, Percent | 300% Modulus, p.s.i. | Tensile, p.s.i. | Elongation, Percent | ΔT, °F. | Resilience, Percent | Flex Life, M | Shore Hardness | 212° F. Compounded MS-1½ | Minimum Mooney | 5 Point Rise, min. |
|---|---|---|---|---|---|---|---|---|---|---|---|---|---|---|
| 5 | 1.0 | 1.5 | 1.0 | 16.2 | 770 | 2,170 | 510 | 41.2 | 70.9 | 2.6 | 53 | 25.5 | 26.5 | 23.5 |
| 6 | 1.25 | 1.5 | 1.0 | 14.8 | 975 | 1,760 | 430 | 37.5 | 72.7 | 1.7 | 54.5 | 26 | 27 | 22 |
| 7 | 1.5 | 1.5 | 1.0 | 14.5 | 1,000 | 1,790 | 410 | 35.1 | 73.9 | 1.2 | 55 | 26 | 27 | 20 |
| 8 | 1.5 | 1.5 | 1.25 | 13.7 | 1,100 | 1,700 | 380 | 33.1 | 75.3 | 0.5 | 55 | 25.5 | 26.5 | 20 |

OVEN AGED 24 HOURS AT 212° F.

(75/25 Butadiene/2-Methyl-5-Vinylpyridine Rubber)

| Sample No. | Sulfur, phr. | Sulfasan R, phr. | NOBS Special, phr. | Compression Set, Percent | 300% Modulus, p.s.i. | Tensile, p.s.i. | Elongation, Percent | ΔT, °F. | Resilience, Percent | Flex Life, M | Shore Hardness | 212° F. Compounded MS-1½ | Minimum Mooney | 5 Point Rise, min. |
|---|---|---|---|---|---|---|---|---|---|---|---|---|---|---|
| 1 | 1.0 | 1.5 | 1.0 | | 1,200 | 1,800 | 375 | 41.9 | 70.7 | 6.8 | 56 | | | |
| 2 | 1.25 | 1.5 | 1.0 | | 1,330 | 1,999 | 365 | 37.8 | 72.7 | 1.3 | 57 | | | |
| 3 | 1.5 | 1.5 | 1.0 | | 1,410 | 1,980 | 370 | 36.5 | 73.9 | 0.7 | 57.5 | | | |
| 4 | 1.5 | 1.5 | 1.25 | | 1,530 | 1,740 | 330 | 34.8 | 73.9 | 0.7 | 58 | | | |

(85/15 Butadiene/2-Methyl-5-Vinylpyridine Rubber)

| Sample No. | Sulfur, phr. | Sulfasan R, phr. | NOBS Special, phr. | Compression Set, Percent | 300% Modulus, p.s.i. | Tensile, p.s.i. | Elongation, Percent | ΔT, °F. | Resilience, Percent | Flex Life, M | Shore Hardness | 212° F. Compounded MS-1½ | Minimum Mooney | 5 Point Rise, min. |
|---|---|---|---|---|---|---|---|---|---|---|---|---|---|---|
| 5 | 1.0 | 1.5 | 1.0 | | 1,110 | 1,860 | 400 | 37.8 | 73.5 | 0.8 | 57.5 | | | |
| 6 | 1.25 | 1.5 | 1.0 | | 1,270 | 2,000 | 380 | 35.5 | 75.9 | 0.8 | 58.5 | | | |
| 7 | 1.5 | 1.5 | 1.0 | | 1,420 | 1,950 | 380 | 34.4 | 77.6 | 0.7 | 59 | | | |
| 8 | 1.5 | 1.5 | 1.25 | | 1,510 | 1,640 | 320 | 33.1 | 78.5 | 0.4 | 59.5 | | | |

EXAMPLE V

A 75/25 butadiene/2-methyl-5-vinylpyridine rubber, having a Mooney value (ML-4) of 41, was compounded in accordance with the following recipe:

| | Parts by weight |
|---|---|
| Rubber | 100 |
| Precipitated hydrated silica [1] | 54 |
| Zinc oxide | 3 |
| Flexamine [2] | 1 |
| Stearic acid | 2 |
| Circo-para [2] | 10 |
| Sulfur | 1.5 |
| Sulfasan R [2] | 1.5 |
| NOBS Special [2] | 1.25 |

[1] Hi Sil 233.
[2] As in Example I.

The samples were milled, cured 30 minutes at 307° F., and physical properties determined. Results are given in Table 6.

TABLE 6

| | |
|---|---|
| Unaged samples: | |
| Compression set percent | 23.4 |
| 300% modulus, 80° F. | 1,220 |
| Tensile, p.s.i., 80° F. | 3,040 |
| Elongation, percent, 80° F. | 580 |
| 200° F. maximum tensile, p.s.i. | 700 |
| ΔT, F. | 51.3 |
| Resilience, percent | 69.4 |
| Shore hardness | 65 |
| Compounded MS-1½ at 212° F. | 39.5 |
| Scorch at 280° F.— | |
| Minimum Mooney | 47.5 |
| 5 point rise, minutes | 11.5 |
| Oven aged 24 hours at 212° F.: | |
| 300% modulus, 80° F. | 1,950 |
| Tensile, p.s.i., 80° F. | 2,830 |
| Elongation, percent, 80° F. | 410 |
| ΔT, F. | 39.2 |
| Resilience, percent | 73.1 |

EXAMPLE VI

A 75/25 butadiene/2-methyl-5-vinylpyridine rubber such as that used in Example V was compounded in accordance with the following recipe:

| | Parts by weight |
|---|---|
| Rubber | 100 |
| Carbon black (Philblack O) | 50 |
| Zinc oxide | 3 |
| Stearic acid | 1 |
| Flexamine [1] | 1 |
| Circo-para [1] | 10 |
| Sulfur | 1.0 |
| Sulfasan R [1] | 1.5 |
| Santocure [2] | 0.8 |

[1] As in Example I.
[2] N-cyclohexyl-2-benzothiazylsulfenamide.

The samples were milled, cured 30 minutes at 307° F., and physical properties determined. Results are given in Table 7.

TABLE 7

| | |
|---|---|
| Compression set, percent | 17.0 |
| 300% modulus, p.s.i., 80° F. | 1,580 |
| Tensile, p.s.i., 80° F. | 3,080 |
| Elongation, percent, 80° F. | 505 |
| Shore hardness [1] | 60.5 |
| Scorch at 280° F.: | |
|    Minimum Mooney | 28 |
|    5 point rise, minutes | 16.5 |

[1] On compression set pellets.

The preceding examples illustrate the effectiveness of curing various vinylpyridine rubbers with vulcanizing systems containing sulfur, 4-4′ dithiodimorpholine and N-oxydiethylene-2-benzothiazylsulfenamide and N-cyclohexyl-2-benzothiazylsulfenamide. Referring particularly to Table I, which contains vulcanization data of a 75/25 butadiene-2-methyl-5-vinylpyridine copolymer, it is to be noted that samples 26 and 27, which contained no sulfur, failed to cure. The same is true of samples 28 and 29 which contained less than 0.4 part of sulfur per 100 parts of rubber. Sample 25 which contained no 4-4′ dithiodimorpholine was cured, however, the scorch time at 280° F. (minutes to 5 point rise) was very low, indicating poor resistance to scorch. The effect of various quantities of 4-4′ dithiodimorpholine is clearly shown by runs 2, 3, 4 and 5, where the quantity of sulfur and N-oxydiethylene-2-benzothiazylsulfenamide were held constant.

Referring to the data on scorch it is noted that as the amount of 4-4′ dithiodimorpholine is increased from 1.0 to 2.5 parts, the scorch time at 280° F. (minutes to 5 point rise) increased from 14 to 22 minutes and the scorch time at 300° F. (minutes to 5 point rise) increased from 8 to 12.5 minutes, thus indicating the effectiveness of increased amounts of this material in the vulcanization system.

The data of this table and the other examples as presented in Tables 2 to 6 similarly illustrate the effectiveness of the vulcanization system of this invention. For example, in Table 3 are presented data relating to the vulcanization of terpolymers of butadiene, styrene and 2-methyl-5-vinylpyridine and butadiene, 2-methyl-5-vinylpyridine and acrylonitrile. It is to be noted that a substantial increase in scorch time (minutes to 5 point rise) is obtained with the use of the three component mixture sulfur, 4-4′ dithiodimorpholine, N-oxydiethylene-2-benzothiazylsulfenamide. Tables 4, 5 and 6 show the effectiveness of the aforedescribed vulcanizing mixture when used with a series of butadiene-2-methyl-5-vinylpyridine copolymers in preventing premature vulcanization or scorch. In Table 7 similar data is presented for a 75/25 butadiene-2-methyl-5-vinylpyridine copolymer vulcanized with sulfur, 4-4′ dithiodimorpholine and N-cyclohexyl-2-benzothiazylsulfenamide, again illustrating the effectiveness of the 3-component mixture in preventing scorch.

I claim:

1. A vulcanized rubber prepared by incorporating into a rubbery copolymer of butadiene and 2-methyl-5-vinylpyridine prepared from a monomer mixture containing from about 25 to about 5 parts of 2-methyl-5-vinylpyridine and from about 75 to about 95 parts butadiene, between about 0.4 and about 2.25 parts of sulfur, between about 0.5 and about 4 parts of 4,4′ dithiodimorpholine and between about 0.25 and about 2 parts of a compound selected from the group consisting of N-oxydiethylene-2-benzothiazylsulfenamide and N-cyclohexyl-2-benzothiazylsulfenamide, based on 100 parts of rubber and vulcanizing the rubber.

2. The vulcanized rubber of claim 1 in which the compound is N-oxydiethylene-2-benzothiazylsulfenamide.

3. The vulcanized rubber of claim 1 in which the compound is N-cyclohexyl-2-benzothiazylsulfenamide.

4. A vulcanized rubber prepared by incorporating into a terpolymer of styrene, butadiene, and 2-methyl-5-vinylpyridine, prepared from a monomer mixture containing from about 25 to about 5 parts by weight of 2-methyl-5-vinylpyridine, from about 75 to about 95 parts by weight of butadiene and up to about 45 parts by weight of styrene, between about 0.4 and about 2.25 parts of sulfur, between about 0.5 and about 4 parts of 4-4′ dithiodimorpholine and between about 0.25 and about 2 parts of a compound selected from the group consisting of N-oxydiethylene-2-benzothiazylsulfenamide and N-cyclohexyl-2-benzothiazylsulfenamide, based on 100 parts of rubber and vulcanizing the rubber.

5. The vulcanized rubber of claim 4 in which the compound is N-oxydiethylene-2-benzothiazylsulfenamide.

6. The vulcanized rubber of claim 4 in which the compound is N-cyclohexyl-2-benzothiazylsulfenamide.

7. The method for curing a rubbery copolymer of butadiene and 2-methyl-5-vinylpyridine prepared from a monomer mixture containing from about 75 to about 95 parts by weight of butadiene and from about 25 to about 5 parts by weight of 2-methyl-5-vinylpyridine which comprises incorporating with said rubber between about 0.4 and about 2.25 parts of sulfur, between about 0.5 and about 4 parts of 4-4′ dithiodimorpholine and between about 0.25 and about 2 parts of a compound selected from the group consisting of N-oxydiethylene-2-benzothiazylsulfenamide and N-cyclohexyl-2-benzothiazylsulfenamide, based on 100 parts of rubber and vulcanizing the rubber.

8. The method for curing a rubbery terpolymer of butadiene, styrene and 2-methyl-5-vinylpyridine prepared from a monomer mixture containing from about 75 to about 95 parts by weight of butadiene, up to about 45 parts by weight of styrene and from about 25 to about 5 parts by weight of 2-methyl-5-vinylpyridine which comprises incorporating with said rubber between about 0.4 and about 2.25 parts of sulfur, between about 0.5 and about 4 parts of 4-4′ dithiodimorpholine and between about 0.25 and about 2 parts of a compound selected from the group consisting of N-oxydiethylene-2-benzothiazylsulfenamide and N-cyclohexyl-2-benzothiazylsulfenamide, based on 100 parts of rubber and vulcanizing the rubber.

9. A vulcanized rubber prepared by incorporating into a rubber selected from the group consisting of rubbery copolymers of vinylpyridines represented by the formula

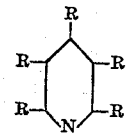

where R is selected from the group consisting of hydrogen, alkyl, vinyl and alpha-methyl vinyl groups, with at least one and not more than two of the groups being selected from the group consisting of vinyl and alpha-methylvinyl, and the total number of carbon atoms in the alkyl groups being not greater than 12, with conjugated dienes containing 4 to 8 carbon atoms per molecule and cyano and lower alkoxy substituted conjugated dienes; and rubbery terpolymers of said vinylpyridines with (1) said conjugated dienes and cyano and lower alkoxy substituted conjugated dienes and (2) polymerizable monomers selected from the group consisting of styrene, lower alkyl and alkoxy substituted styrenes, acrylonitrile, methacrylonitrile and lower alkyl acrylates and methacrylates; in which the monomer mixture from which the copolymers and terpolymers are prepared contains from about 25 to about 5 parts by weight of the vinylpyridine, from about 75 to about 95 parts by weight of the conjugated diene and cyano and lower alkoxy substituted conjugated dienes and from 0 to about 45 parts by weight of the polymerizable monomer; between about 0.4 and about 2.25 parts of sulfur, between about 0.05 and about 4 parts of 4-4′ dithiodimorpholine and between about 0.25 and about 2 parts of a compound selected from the group consisting of N-oxydiethylene-2-benzothiazylsulfenamide and N-cyclohexyl-2-benzothiazylsulfenamide, based on 100 parts of said rubber and vulcanizing the rubber.

10. A composition of matter comprising a rubber selected from the group consisting of rubbery copolymers of vinylpyridines represented by the formula

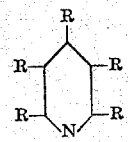

where R is selected from the group consisting of hydrogen, alkyl, vinyl and alpha-methyl vinyl groups, with at least one and not more than two of the groups being selected from the group consisting of vinyl and alpha-methylvinyl, and the total number of carbon atoms in the alkyl groups being not greater than 12, with conjugated dienes containing 4 to 8 carbon atoms per molecule and cyano and lower alkoxy substituted conjugated dienes; and rubbery terpolymers of said vinylpyridines with (1) said conjugated dienes and cyano and lower alkoxy substituted conjugated dienes and (2) polymerizable monomers selected from the group consisting of styrene, lower alkyl and alkoxy substituted styrenes, acrylonitrile, methacrylonitrile and lower alkyl acrylates and methacrylates; in which the monomer mixture from which the copolymers and terpolymers are prepared contains from about 25 to about 5 parts by weight of the vinylpyridine, from about 75 to about 95 parts by weight of the conjugated diene and cyano and lower alkoxy substituted conjugated dienes and from 0 to about 45 parts by weight of the polymerizable monomer; between about 0.4 and about 2.25 parts of sulfur, between about 0.05 and about 4 parts of 4-4' dithiodimorpholine and between about 0.25 and about 2 parts of a compound selected from the group consisting of N-oxydiethylene-2-benzothiazylsulfenamide and N-cyclohexyl-2-benzothiazylsulfenamide, based on 100 parts of said rubber.

11. A rubber mix comprising a rubber selected from the group consisting of rubbery copolymers of vinylpyridines represented by the formula

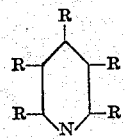

wherein R is selected from the group consisting of hydrogen, alkyl, vinyl and alpha-methyl vinyl groups, with at least one and not more than two of the groups being selected from the group consisting of vinyl and alpha-methylvinyl, and the total number of carbon atoms in the alkyl groups being not greater than 12, with conjugated dienes containing 4 to 8 carbon atoms per molecule and cyano and lower alkoxy substituted conjugated dienes; and rubbery terpolymers of said vinylpyridines with (1) said conjugated dienes and cyano and lower alkoxy substituted conjugated dienes and (2) polymerizable monomers selected from the group consisting of styrene, lower alkyl and alkoxy substituted styrenes, acrylonitrile, methacrylonitrile and lower alkyl acrylates and methacrylates; in which the monomer mixture from which the copolymers and terpolymers are prepared contains from about 25 to about 5 parts by weight of the vinylpyridine, from about 75 to about 95 parts by weight of the conjugated diene and cyano and lower alkoxy substituted conjugated dienes and from 0 to about 45 parts by weight of the polymerizable monomer; between about 0.4 and about 2.25 parts of sulfur, between about 0.05 and about 4 parts of 4-4' dithiodimorpholine and between about 0.25 and about 2 parts of a compound selected from the group consisting of N-oxydiethylene-2-benzothiazylsulfenamide and N-cyclohexyl-2-benzothiazylsulfenamide, based on 100 parts of said rubber.

12. A method for curing a rubber selected from the group consisting of rubber copolymers of vinylpyridines represented by the formula

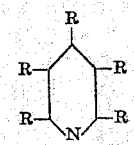

where R is selected from the group consisting of hydrogen, alkyl, vinyl and alpha-methyl vinyl groups, with at least one and not more than two of the groups being selected from the group consisting of vinyl and alpha-methylvinyl, and the total number of carbon atoms in the alkyl groups being not greater than 12, with conjugated dienes containing 4 to 8 carbon atoms per molecule and cyano and lower alkoxy substituted conjugated dienes; and rubbery terpolymers of said vinylpyridines with (1) said conjugated dienes and cyano and lower alkoxy substituted conjugated dienes and (2) polymerizable monomers selected from the group consisting of styrene, lower alkyl and alkoxy substituted styrenes, acrylonitrile, methacrylonitrile and lower alkyl acrylates and methacrylates; in which the monomer mixture from which the copolymers and terpolymers are prepared contains from about 25 to about 5 parts by weight of the vinylpyridine, from about 75 to about 95 parts by weight of the conjugated diene and cyano and lower alkoxy substituted conjugated dienes and from 0 to about 45 parts by weight of the polymerizable monomer which comprises incorporating with said rubber between about 0.4 and about 2.25 parts of sulfur, between about 0.5 and about 4 parts of 4-4' dithiodimorpholine and between about 0.25 and about 2 parts of a compound selected from the group consisting of N-oxydiethylene-2-benzothiazylsulfenamide and N-cyclohexyl-2-benzothiazylsulfenamide, based on 100 parts of rubber and vulcanizing the rubber.

13. A vulcanized rubber prepared by incorporating into a terpolymer of acrylonitrile, butadiene and 2-methyl-5-vinylpyridine, prepared from a monomer mixture containing from about 25 to about 5 parts by weight of 2-methyl-5-vinylpyridine, from about 75 to about 95 parts by weight of butadiene and up to about 45 parts by weight of acrylonitrile, between about 0.4 and about 2.25 parts of sulfur, between about 0.5 and about 4 parts of 4-4' dithiodimorpholine and between about 0.25 and about 2 parts of a compound selected from the group consisting of N-oxydiethylene-2-benzothiazylsulfenamide and N-cyclohexyl-2-benzothiazylsulfenamide, based on 100 parts of rubber and vulcanizing the rubber.

14. The vulcanized rubber of claim 13 in which the compound is N-oxydiethylene-2-benzothiazylsulfenamide.

15. The vulcanized rubber of claim 13 in which the compound is N-cyclohexyl-2-benzothiazylsulfenamide.

16. The method for curing a rubbery terpolymer of butadiene, acrylonitrile and 2-methyl-5-vinylpyridine prepared from a monomer mixture containing from about 75 to about 95 parts by weight of butadiene, up to about 45 parts by weight of acrylonitrile and from about 25 to about 5 parts by weight of 2-methyl-5-vinylpyridine which comprises incorporating with said rubber between about 0.4 and about 2.25 parts of sulfur, between about 0.5 and about 4 parts of 4-4' dithiodimorpholine and between about 0.25 and about 2 parts of a compound selected from the group consisting of N-oxydiethylene-2-benzothiazylsulfenamide and N-cyclohexyl-2-benzothiazylsulfenamide, based on 100 parts of rubber and vulcanizing the rubber.

17. The vulcanized rubber of claim 1 in which the rubbery copolymer is prepared from a monomer mixture which contains 75 parts of butadiene and 25 parts of 2-methyl-5-vinylpyridine.

18. The vulcanized rubber of claim 1 in which the rubbery copolymer is prepared from a monomer mixture which contains 85 parts of butadiene and 15 parts of 2-methyl-5-vinylpyridine.

19. The vulcanized rubber of claim 4 in which the rubbery terpolymer is prepared from a monomer mixture which contains 85 parts of butadiene, 10 parts of styrene and 5 parts of 2-methyl-5-vinylpyridine.

20. The vulcanized rubber of claim 13 in which the rubbery terpolymer is prepared from a monomer mixture which contains 70 parts of butadiene, 20 parts of acrylonitrile and 10 parts of 2-methyl-5-vinylpyridine.

References Cited in the file of this patent

UNITED STATES PATENTS

| | | |
|---|---|---|
| 2,481,810 | Barton | Sept. 13, 1949 |
| 2,490,518 | Hand | Dec. 6, 1949 |
| 2,681,331 | Howland | June 15, 1954 |

OTHER REFERENCES

Rubber Chem. & Tech. 24, 211–223 (1951). (Copy in library.)

Railsback et al: Ind. and Eng. Chem., vol. 49, No. 6, pages 1043–1050, June 1957.